(12) United States Patent  
Warnick et al.

(10) Patent No.: US 9,124,698 B2  
(45) Date of Patent: Sep. 1, 2015

(54) VIRTUAL CALLING MODES

(71) Applicant: Bank of America Corporation, Charlotte, NC (US)

(72) Inventors: David Lee Warnick, Rising Sun, MD (US); Chung-Di Chou, Wilmington, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/068,564

(22) Filed: Oct. 31, 2013

(65) Prior Publication Data

US 2015/0117630 A1    Apr. 30, 2015

(51) Int. Cl.
*H04M 3/00* (2006.01)
*H04M 3/51* (2006.01)
*H04M 3/523* (2006.01)

(52) U.S. Cl.
CPC .......... *H04M 3/5183* (2013.01); *H04M 3/5158* (2013.01); *H04M 3/523* (2013.01)

(58) Field of Classification Search
USPC ........ 379/265.01–265.14, 266.01–266.1, 309
See application file for complete search history.

(56) References Cited

U.S. PATENT DOCUMENTS 7,046,789 B1 * 5/2006 Anderson et al. ........ 379/265.01
7,383,215 B1 * 6/2008 Navarro et al. ............. 705/36 R
7,509,653 B2 * 3/2009 Das et al. ...................... 719/318
7,702,575 B1 * 4/2010 Lofton et al. ................... 705/38
8,358,771 B1    1/2013 Moore et al.
8,867,732 B1 * 10/2014 Hoen, IV ................. 379/265.09
2002/0087385 A1    7/2002 Vincent
2008/0032679 A1 * 2/2008 Purontaus et al. ............ 455/417
2009/0037306 A1 * 2/2009 Hill ................................ 705/35

FOREIGN PATENT DOCUMENTS

WO    WO 2007/084732 A2    7/2007
WO    WO 2008/011555 A2    1/2008

OTHER PUBLICATIONS

Great Britain Combined Search and Examination Report Under Sections 17 & 18(3), for Application No. GB1417875.0, dated Mar. 9, 2015, 8 pages.
Great Britain Combined Search Report Under Section 17(5)(B) and Abbreviated Examination Report Under Section 18(3), for Application No. GB 1417896.6, dated Mar. 23, 2015, 8 pages.
Great Britain Combined Search Report Under Section 17(5)(B) and Abbreviated Examination Report Under Section 18(3), for Application No. GB 1417889.1, dated Mar. 19, 2015, 6 pages.

(Continued)

*Primary Examiner* — William Deane, Jr.
(74) *Attorney, Agent, or Firm* — Michael A. Springs; Moore & Van Allen PLLC; Patrick B. Horne

(57) ABSTRACT

Embodiments for implementing virtual dialing campaigns using virtual calling modes include systems for receiving account data associated with customer accounts and identifying an account status associated with each of the accounts based on the account data. The embodiments further include grouping the accounts into one or more queues based on the identified account status, selecting a first call mode for at least one queue, determining dialing parameters associated with the first call mode, providing the at least one queue to a user via a display of a computing device that is in communication with the system, and launching an account from the at least one queue.

18 Claims, 6 Drawing Sheets

(56) References Cited

OTHER PUBLICATIONS

Great Britain Combined Search Report Under Section 17(5)(B) and Abbreviated Examination Report Under Section 18(3), for Application No. GB 1417882.6, dated Mar. 23, 2015, 6 pages.

Great Britain Combined Search and Examination Report Under Sections 17 & 18(3), for Application No. GB1417894.1, dated Mar. 12, 2015, 6 pages.

Great Britain Combined Search and Examination Report Under Sections 17 & 18(3), for Application No. GB1417875.0, dated Mar. 7, 2015, 5 pages.

* cited by examiner

FIG. 6

VIRTUAL CALLING MODES

BACKGROUND

Companies often rely on calling campaigns to reach their customers. Based on regulations, time zones, customer preferences, and the like, each customer may require different calling strategies. For example, a customer may prefer to be contacted on certain days of the week or times of day, or certain law may restrict the number of calls or the phone number that can be used to contact the customer. Because each call may have different restrictions or preferences, determining and executing calling campaigns that are efficient, compliant, and satisfactory to customers can be challenging.

BRIEF SUMMARY

The embodiments provided herein are directed to systems for implementing virtual dialing campaigns using virtual calling modes. In some embodiments, the systems include a computer apparatus including a processor and a memory and a virtual dialer software module stored in the memory, comprising executable instructions that when executed by the processor cause the processor to: receive account data associated with customer accounts. In some embodiments, the executable instructions further cause the processor to identify an account status associated with each of the accounts based on the account data. In some embodiments, the executable instructions further cause the processor to group the accounts into one or more queues based on the identified account status; In some embodiments, the executable instructions further cause the processor to select a first call mode for at least one queue. In some embodiments, the executable instructions further cause the processor to determine dialing parameters associated with the first call mode. In some embodiments, the executable instructions further cause the processor to provide the at least one queue to a user via a display of a computing device that is in communication with the system.

In some embodiments of the systems, the executable instructions further cause the processor to launch a first account from a first queue of the at least one queue and provide an inward call to the user in accordance with the first calling mode. In other embodiments, the executable instructions further cause the processor to switch the first calling mode to a second calling mode. In still other embodiments, the executable instructions further cause the processor to allow the user initiate an outward call associated with a second account of a second queue of the at least one account in accordance with the second calling mode. In further embodiments, the executable instructions further cause the processor to switch the second calling mode back to the first calling mode; launch a second account from the first queue; and provide a second inward call to the user in accordance with the first calling mode. In some embodiments, the executable instructions further cause the processor to allow the user to select an account from the second queue and dial a second outward call from the computing device.

In other embodiments of the systems, the executable instructions further cause the processor to allow the user to select at least one of a delay period and dialing strategy for at least one account in the at least one queue, wherein the dialing strategy comprises a dialing order for every phone number associated with the at least one account. In still other embodiments, the executable instructions further cause the processor to automatically initiate a first outward call associated with the first account from the computing device after the delay period of in accordance with the calling strategy. In further embodiments, the executable instructions further cause the processor to automatically initiate a second outward call associated with the first account or associated with a second account. In some embodiments, the executable instructions further cause the processor to switch the first calling mode to a second calling mode. In other embodiments, the at least one queue comprises accounts having balance due dates for a pre-selected period of time.

In still other embodiments of the system, the account data comprises account numbers, customer names, account phone numbers, account balances, payment due dates, account calling history, account velocities, or regulations. In some embodiments, the executable instructions further cause the processor to apply filter criteria to the account data; and prioritize the accounts based on the filter criteria.

Further provided herein are embodiments directed to a computer program product for implementing virtual dialing campaigns using virtual calling modes. In some embodiments, the computer program product comprises a computer readable storage medium having computer readable program code embodied therewith, the computer readable program code comprising computer readable program code configured to receive account data associated with customer accounts. In some embodiments, the computer program product further includes computer readable program code configured to identify an account status associated with each of the accounts based on the account data. In some embodiments, the computer program product further includes computer readable program code configured to group the accounts into one or more queues based on the identified account status. In some embodiments, the computer program product further includes computer readable program code configured to select a first call mode for at least one queue. In some embodiments, the computer program product further includes computer readable program code configured to determine dialing parameters associated with the first call mode. In some embodiments, the computer program product further includes computer readable program code configured to provide the at least one queue to a user via a display of a computing device that is in communication with the system.

In further embodiments, the computer program product further includes computer readable program code configured to launch a first account from a first queue of the at least one queue and provide an inward call to the user in accordance with the first calling mode. In some embodiments, the computer program product further includes computer readable program code configured to switch the first calling mode to a second calling mode. In other embodiments, the computer program product further includes computer readable program code configured to allow the user to select at least one of a delay period and dialing strategy for a second account in a second queue of the at least one queue, wherein the dialing strategy comprises a dialing order for every phone number associated with the at least one account. In still other embodiments, the computer program product further includes computer readable program code configured to initiate an assisted outward call associated with the second account from the computing device after the delay period or in accordance with the dialing strategy.

In additional embodiments, a computer-implemented method for implementing virtual dialing campaigns using virtual calling modes is provided. In some embodiments, the method includes receiving account data associated with customer accounts. In some embodiments, the method includes identifying, by a processor, an account status associated with each of the accounts based on the account data. In some embodiments, the method includes grouping the accounts into one or more queues based on the identified account status. In some embodiments, the method includes selecting, by a processor, a first call mode for at least one queue. In some embodiments, the method includes determining dialing parameters associated with the first call mode. In some embodiments, the method includes providing, by a processor, the at least one queue to a user via a display of a computing device.

In additional embodiments of the method, the method includes launching a first account from a first queue of the at least one queue and providing an inward call to the user in accordance with the first calling mode. In some embodiments, the method includes switching the first calling mode to a second calling mode. In other embodiments, the method includes initiating an assisted outward call associated with a second account of a second queue of the at least one account in accordance with the second calling mode.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 6 is an illustration of a graphical user interface for providing virtual calling modes to a system user in accordance with various embodiments.

DETAILED DESCRIPTION

Figure 1:
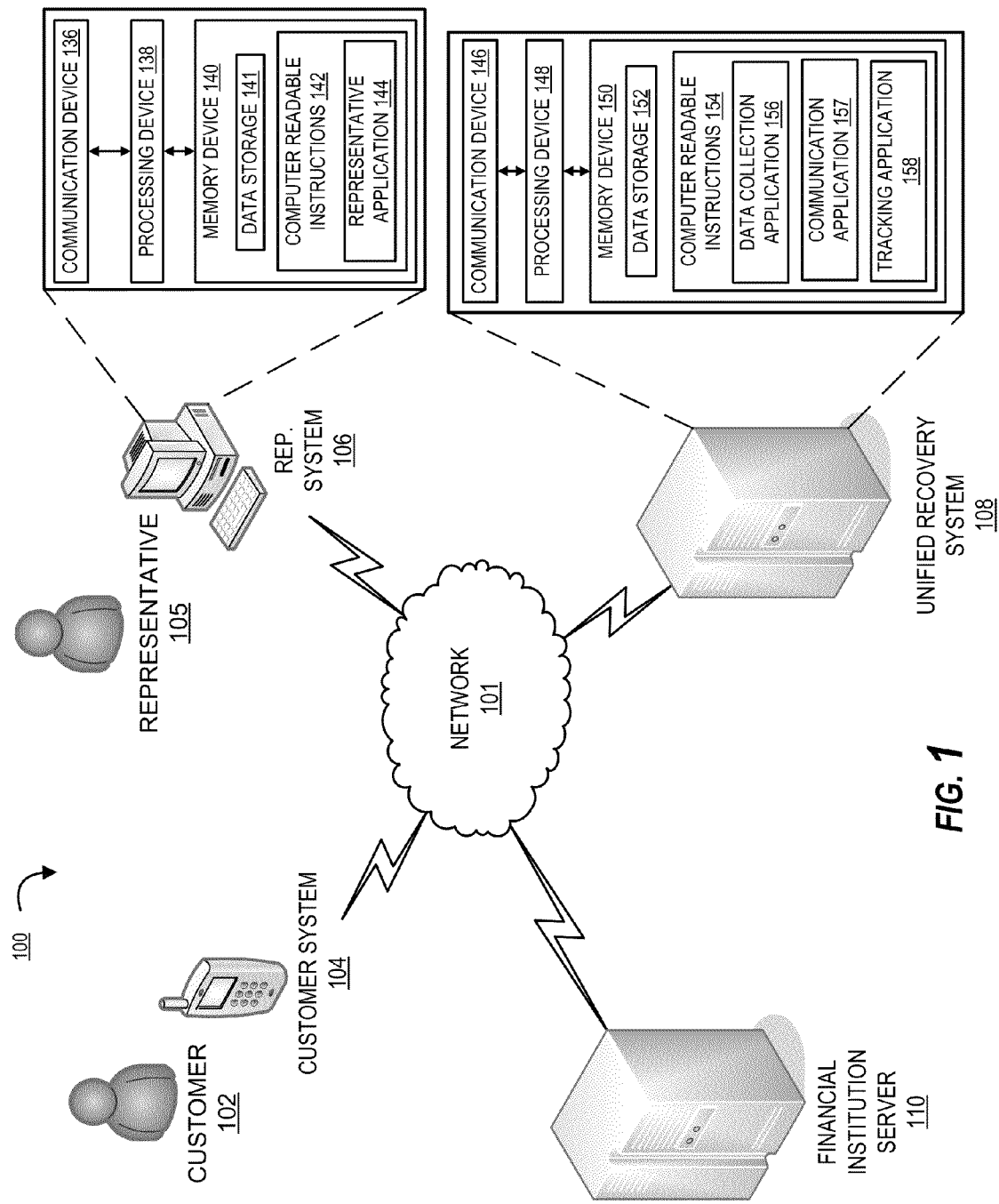
FIG. 1 provides a block diagram illustrating a system and environment for providing virtual calling modes.

The embodiments presented herein are directed to systems, methods, and computer program products for providing and configuring virtual calling modes for dialing campaigns. In some embodiments, accounts are grouped into queues based on account statuses such as payment due dates. One or more calling modes are assigned to each queue. The calling modes include inward call modes, outward call modes, manual dial modes, view first modes, browse modes, auto dialing modes, and the like. In some embodiments, the selected calling modes are blended to include, for example, inward call, outward calls, manual dialing, and assisted dialing. In this way outward bound dialing campaigns can be implemented while at the same time inward bound calls from customers can be more efficiently and quickly processed, which in turn reduces customer call abandonment rates and increases customer satisfaction.

The embodiments of the disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 provides a unified recovery system environment 100, in accordance with embodiments of the present invention. As illustrated in FIG. 1, a unified recover system 108 is operatively coupled, via a network 101 to a customer system 104, to a representative system 106, and to a financial institution server 110. In this way, the unified recovery system 108 can send information to and receive information from the customer system 104, the representative system 106, and financial institution server 110, to correlate all of the customer's relationships with an entity into one unified recovery system. FIG. 1 illustrates only one example of an embodiment of a unified recovery system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, a customer 102 is an individual who has products with the entity. These products may be one or more contracts, accounts, loans, transactions, agreements, or the like. As such, the customer 102 may have one or more products with payments in arrears. In some embodiments, the customer 102 may be a merchant or a person, employee, agent, independent contractor, and the like acting on behalf of the merchant that may have one or more products with payments in arrears with the entity.

As illustrated in FIG. 1, the unified recovery system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to a representative system 106, a customer system 104, and a financial institution server 110. As such, the communication device 146 generally comprises a modem, server, or other device for communicating with other devices on a network 101.

As further illustrated in FIG. 1, the unified recovery system 108 comprises computer-readable instructions 154 stored in the memory device 150, which in one embodiment includes the computer-readable instructions 154 of a data collection application 156. In some embodiments, the computer-readable instructions 154 include a communication application 157. In some embodiments, the computer-readable instructions 154 include a tracking application 158. In still further embodiments, the computer-readable instructions 154 include a deployment application (not shown). In some embodiments, the memory device 150 includes data storage 152 for storing data related to unified recovery system including but not limited to data created and/or used by the data collection application 156, communication application 157, and/or tracking application 158.

In the embodiment illustrated in FIG. 1, the data collection application 156 may collect and compile recover programs utilized across the entity, customer relationship data across an entity, and to generate a centralized location for customer data. In some embodiments, the data collection application 156 may collect and compile recovery products utilized across the entity into a single centralized unified recovery system 108. These may be collected from entity representative systems 106, the financial institution server 110, and/or other systems. These recover products may be internal or external dockets, ledgers, software, systems, or the like that are designed to initiate, monitor, and record any communication or payment associated with customer 102 products in arrears. In further embodiments, the data collection application 156 may collect and compile customer relationship data. In this way, the data collection application 156 may compile all information that an entity may have associated with a customer 102. Customer relationship data may include, but is not limited to addresses associated with a customer, customer contact information, customer associate information, customer products, customer products in arrears, or other information associated with the customer's one or more accounts, loans, products, purchases, agreements, or contracts that a customer may have with the entity. In other embodiments, the data collection application 156 may merge the recovery programs and the customer relationship data together into the unified recovery system 108. This data may be stored grouped by on the customer 102, customer identification number, account number, or telephone number. In this way, the system may generate a single centralized location for customer relationships for a representative to view and interact with. As such, any different recovery products and customer relationship data may be integrated into the one centralized unified recovery system.

In the embodiment illustrated in FIG. 1 the unified recovery system 108 further comprises a communication application 157. The communication application 157 allows for presentment of data to the representative, for rules determination and presentment, determines lead accounts, and for communication via a network 101 with the customer 102. In some embodiments, the communication application 157 allows for presentment of data to the representative. This data may be customer 102 information, prior communications, communication dispositions, current accounts, accounts in arrears, lead accounts, and the like. In this way, the representative may have information associated with all customer relationships within the entity easily accessible for his/her communication with the customer 102. In some embodiments, the communication application 157 allows for incorporation of a rules engine into the information provided to the representative. In some embodiments, the rules associated with the rules engine may be manually inputted by a representative. In some embodiments, the rules associated with the rules engine may be automatically inputted. In some embodiments, the rules may be based on entity requirements or preferences. In some embodiments, the rules may be based on customer preferences. In yet other embodiments, the rules may be based on legal requirements or restrictions. These rules may be communicated to the representative system 106 for the representative 105 from the communication application 157 via the network 101. In this way, the representative 105 may be aware of the rules for customer 102 communications.

Along with the rules, the communication application 157 may also determine a lead account associated with the customer 102, identify an appropriate representative 106, warn or prohibit communications to a customer 102, or require disposition input after a communication. Determining a lead account requires the communication application 157 to communicate with the financial institution server 110 to select an account in arrears that is most important for the entity to recover. Selecting an appropriate representative may be achieved by the communication application 157 based on which representative has experience with that particular customer, knowledge with that particular lead account, or general expertise regarding a field associated with the lead account. The communication application 157 may communicate warning or prohibiting communications to a customer 102 via the network 101 to a representative system 106.

In some embodiments, the communication application 157 may allow for representative 105 communications with the customer 102 via the network 101. In this way, the communication application 157 allows for the communication, limits the communication, and/or doesn't allow any communication based on the rules determined. In the embodiment illustrated in FIG. 1, the unified recovery system 108 further comprises a tracking application 158. The tracking application 158 tracks the communications of customer 102. As such, dates, times, outcomes, responses, dispositions, or the like associated with each and every attempt to contact the customer 102. In this way, the system may track whether a communication went through to the customer, whom the representative spoke to, the duration of the communication, time of communication, date of communication, or the like.

As illustrated in FIG. 1, a representative 105 may be an individual customer service representative for an entity, an operator, and the like. In some embodiments the representative 105 may be an individual employed by the entity. In some embodiments, the representative 105 may be an outside contractor for the entity. The representative 105 may have unique skills or experience with recovery payments in arrears for various products associated with products provided by the entity.

As illustrated in FIG. 1, the representative system 106 generally comprises a communication device 136, a processing device 138, and a memory device 140. The processing device 138 is operatively coupled to the communication device 136 and the memory device 140. In some embodiments, the processing device 138 may send or receive data from the customer system 104, financial institution server 110, and/or the unified recover system 108 via the communication device 136 over a network 101. As such, the communication device 136 generally comprises a modem, server, or other device for communicating with other devices on the network 101.

As further illustrated in FIG. 1, the representative system 106 comprises computer-readable instructions 142 stored in the memory device 140, which in one embodiment includes the computer-readable instructions 142 of a representative application 144. In the embodiment illustrated in FIG. 1, the representative application 144 allows the representative system 106 to be linked to the unified recovery system 108 to communicate, via a network 101, the information related to the communications with a customer 102 related to products with payments in arrears. In some embodiments, the communication from the representative 105, such as communication inputted on the unified application by the representative 105, may be communicated to the unified recover system 108 via the communication device 136. The representative application 144 may also allow the representative to receive data, such as the unified application including customer relationships, or the like, in order to communicate with the customer. The memory device 140 further includes a data storage device 141.

FIG. 1 also illustrates a customer system 104. The customer system 104 generally comprises systems with devices the same or similar to the devices described for the unified recovery system 108, and/or the representative system 106 (i.e., communication device, processing device, and memory device). Therefore, the customer system 104 may communicate with the unified recovery system 108, the representative system 106, and/or the financial institution server 110 in the same or similar way as previously described with respect to each system. The customer system 104, in some embodiments, is comprised of systems and devices that allow the customer 102 to communicate with the representative 105 over a network 101. The customer system 104 may be, for example, a home phone, a desktop personal computer, a mobile system, such as a cellular phone, smart phone, personal data assistant (PDA), laptop, or the like. Although only a single customer system 104 is depicted in FIG. 1, the unified recovery system environment 100 may contain numerous customer systems 104.

The financial institution server 110 is operatively coupled to the unified recovery system 108, the representative system 106, and/or the customer system 104 through the network 101. The financial institution server 110 has systems with devices the same or similar to the devices described for the unified recovery system 108 and the representative system 106 (i.e., communication device, processing device, and memory device). Therefore, the financial institution server 110 communicate with the unified recovery system 108, the representative system 106, and/or the customer system 104 in the same or similar way as previously described with respect to each system. The financial institution server 110, in some embodiments, is comprised of systems and devices that allow the unified recover system 108, the representative system 106, and the customer system 104 access to one or more accounts associated with the customer 102 with the financial institution.

It is understood that the servers, systems, and devices described herein illustrate one embodiment of the invention. It is further understood that one or more of the servers, systems, and devices can be combined in other embodiments and still function in the same or similar way as the embodiments described herein.

Figure 2:
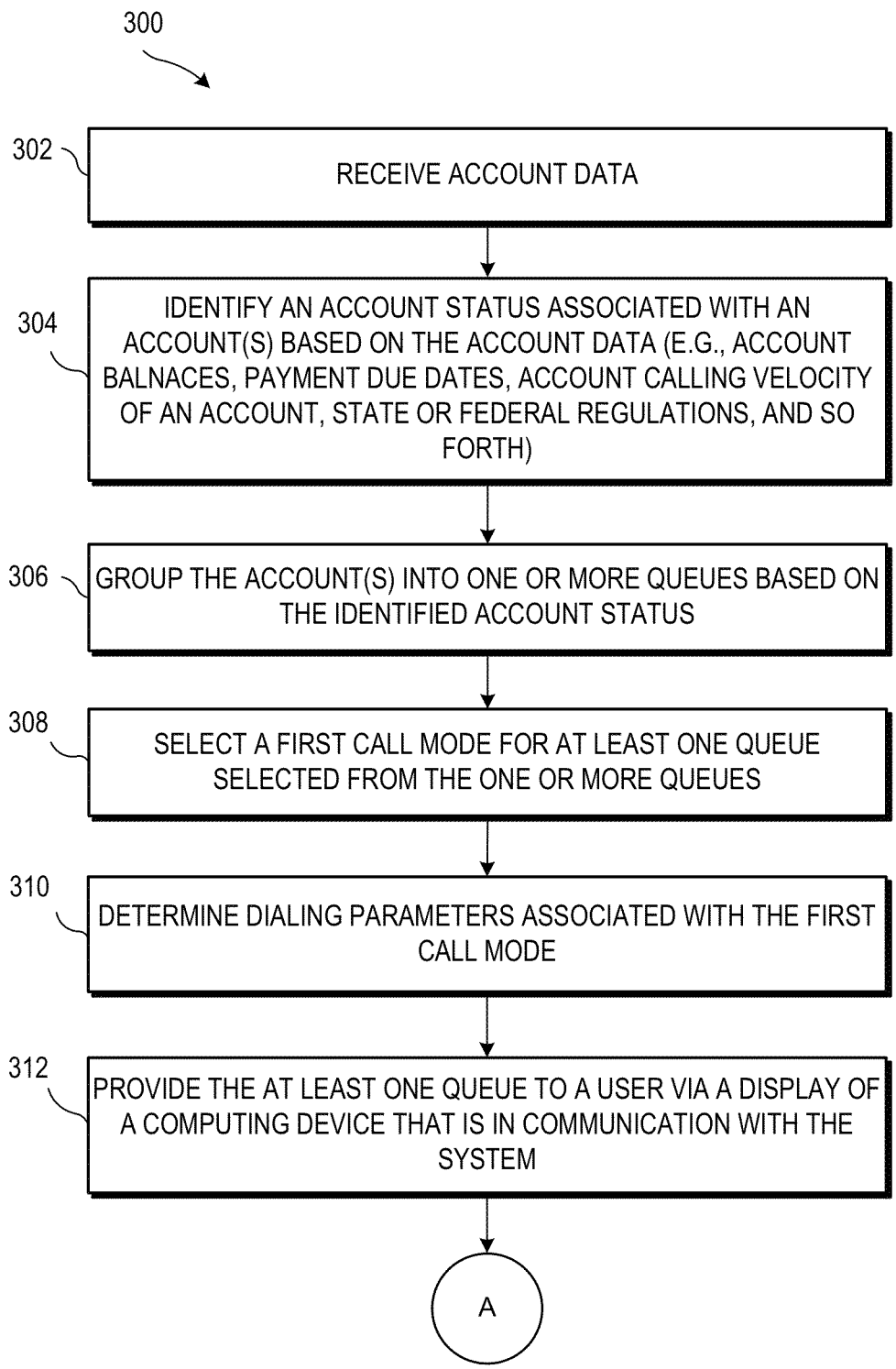
FIG. 2 is a flowchart illustrating a system and method for providing and configuring virtual calling modes.
Figure 3:
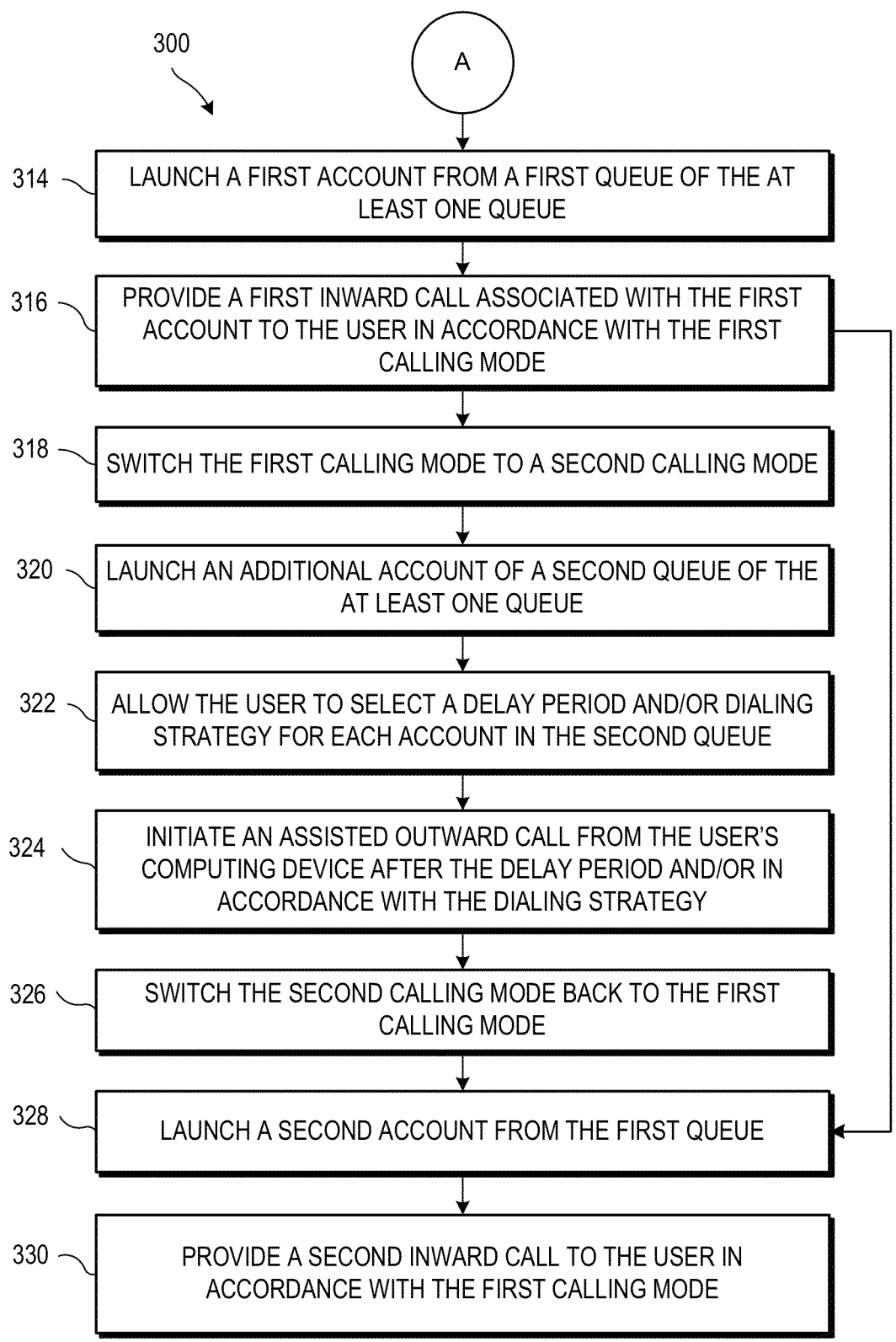
FIG. 3 is a flowchart illustrating a system and method for providing and configuring virtual calling modes in accordance with various embodiments.

FIGS. 2-3 illustrate flowcharts providing an overview of a process 300 for providing and configuring virtual calling modes for virtual dialing campaigns. One or more devices, such as the one or more devices and/or one or more other computing devices and/or servers of FIG. 1, can be configured to perform one or more steps of the process 300 described below. In some embodiments, the one or more devices performing the steps are associated with a financial institution. In other embodiments, the one or more devices performing the steps are associated with a merchant, business, partner, third party, credit agency, account holder, and/or user. As provided herein, it will be understood that the process of FIG. 3 is merely an exemplary embodiment and that the various steps of process 300 can be conducted in any order.

As illustrated at block 302, account data is received. In some embodiments, the account data comprises information from one or more accounts associated with one or more clients, customers, account holder, and/or guarantors. Exemplary account data includes account numbers, phone numbers associated with the account, balances, current payments due dates, past payments due dates, payment history, credit line amounts, loan amounts, types of account, accounts associated with the account customer (e.g., a grouping of accounts designated with an internal ID), age of account, regulations associated with the account, call history associated with the account, social media data associated with account customers, and so forth. The account data, in some embodiments, is received from customers, merchants, third party financial institutions, online accounts, and the like.

As illustrated at block 304, an account status associated with one or more accounts is identified based on the account data. The account status includes an early stage balance dues status (account balances having a due date that is less than 90 days old), a medium stage balance dues status (account balances having a due date that is 50-100 days earlier than the current date), a late stage balance dues status (account balances having a due date that is more than 90 days old), a call cap status, a message cap status, and so forth. For example, if it is determined that a specific account has a payment that was due 27 days ago, then that account may be given an early stage balance dues status. Further, the account status can also be related to calculated calling or messaging velocities (i.e., the number of outbound calls/messages per day, week, or month). Based on state or federal regulations and/or customer instructions, a specific account may be given a status that has a specific call or message cap (e.g., only allowed 2 calls for a particular day based on current number of calls for the day or the week).

As illustrated at block 306, the one or more accounts are grouped into one or more queues based on the identified account status. As used herein a "queue" includes, but is not limited to lists of accounts associated with a dialing campaign. For example, all account having an early stage balance dues status are grouped together in one queue, all accounts having an late stage balance dues status in another queue, and so forth. In some embodiments, the one or more queues may be capped at a certain number. For example, each of the one or more queues may include a maximum of 200 accounts so that the user has enough time in the work day to complete the queue. In other embodiments, the number of accounts in the queue may be limited based on the number of phone numbers for the accounts in the queue, the call or message cap for each account in the queue, the geographical location of the customer, government regulations governing each account, the customer status (e.g., VIP customer), type of account (e.g., checking, savings, credit cards, and so forth), and the like. If 50% or more of the accounts have three or more numbers associated with the account, or more than two customers associated with the account, or a calling cap of more than 3 calls for the account, for example, then the number of accounts in the queue may be limited to 100, while a queue where the portion of accounts with multiple numbers/customers and a high calling cap is less than 20% of the total number of accounts, then the number of accounts in the queue may be higher than 200. In other embodiments, the account number maximum for each of the one or more queues is based on the number of available operators, workloads, holiday schedules, operator experience, and so forth.

As illustrated at block 308, a first call mode is selected for at least one queue selected from the one or more queues. The call modes includes inward call modes, outward call modes, an autopace mode, a view first mode, a manual dial mode, a browse mode, and combinations thereof. In the illustrated embodiment, the first call mode comprises an inward call mode. The inward call modes and outward call modes, in some embodiments, are automated and/or manual. The autopace mode, in some embodiments, includes automated outward dialing. For example, a virtual dialer may automatically dial one or more numbers for each account in a queue such that the operator talking to the customer has no input with regard to the timing of the dialing, the order of dialing, and so forth. In other examples, the dialing campaign in the autopace mode includes only recorded messages. In this way, efficiency is driven higher for dialing campaigns in the autopace mode. The manual dial mode allows a user to receive inward calls or place outward calls manually. In further embodiments, the browse mode enables trainees, managers, or administrators to review calling modes, queues, user actions, accounts, and the like without actually participating in a dialing campaign (i.e., receiving or placing calls). This allows management to determine dialing parameters as discussed in more detail below.

In other embodiments, the first call mode or other call modes associated with the process 300 comprises the view first mode. In the view first mode, outward calls are initiated directly from the user's desktop when an account is launched after a predetermined delay. In some embodiments, the view first mode includes assisted dialing such that the system prompts the first outward call in the queue or in a particular account. After the first assisted dialing occurrence for a particular queue or an account in the queue, the user is allowed to initiate the next call. In the view first mode, the user can set the delay time for reviewing the account and the user can also determine the dialing order for each account (e.g., home number first, work number second, and so forth). Further, because the outward call is initiated from the user's desktop in the view first mode, this mode of dialing is not considered to be an automated dialer and falls outside of the scope of some government regulations related to automated dialers.

In some embodiments, the first call mode or other call mode is selected based on the account status of the accounts in the at least one queue. For example, queues that include accounts with an early stage balance dues status may be assigned to an autopace mode, while queues that include accounts with a medium or late stage balance dues status may be assigned to a mode with a more targeted approach such as the view first mode or the manual dial mode. Queues that include accounts that have a very low calling/messaging cap or that have payments due dates that are more than 90 days old may require greater levels of analysis to determine how many times to call, the best day of the week to call (e.g., pay day), the best time of the day to call, what phone numbers to use, the best form of communication (e.g., text, email, or phone call), which customer associated with a particular account to call (e.g., account history may indicate that the secondary account holder is more responsive than the primary account holder), the dialing order, and the like.

As illustrated at block 310, the dialing parameters associated with the first call mode is determined. In some embodiments, filter and/or sort criteria are applied to the account data in order to determine the dialing parameters. The dialing parameters include account priority of the at least one queue, calling mode rules, user dialing authorization, and so forth. For example, the account may be prioritized in the at least one queue according to due dates, payment amounts, account balances, account types, calling velocity, and so forth. In other examples, the calling mode rules include rules for blending calling modes, criteria for switching calling modes, and the like. The user dialing authorization determines whether or not the user is allowed to stop a dialing campaign after a certain period of time or number of calls, choose the next account in the at least one queue (e.g., in manual dial mode), choose the next number associated with an account to dial, and so forth. In some embodiments, the dialing parameters are based on information obtained in the browse mode (see, e.g., FIG. 6). For example, an administrator or other operator may review accounts in the browse mode to determine the best dialing strategy for a particular account or group of accounts.

As illustrated at block 312, at least one queue is provided to a user via a display of a computing device that is in communication with the system. The system of process 600 can inject modules and code such that the queues assigned to a particular user will appear on the user's desktop when the user logs into the system. Details regarding the display of the queue are provided below with regard to FIGS. 4-6.

Referring now to FIG. 3, the process 300 is further illustrated. As illustrated at block 314, a first account from a first queue of the at least one queue is launched. For example, a user may access the "Queue Explorer" on the system at their workstation to access assigned queues (see, e.g., FIG. 4).

As illustrated at block 316, a first inward call associated with the first account is provided to the user in accordance with the first calling mode. In some embodiments, the second calling mode includes the inward mode and/or manual dialing mode. The accounts of the first queue may include accounts that include only a particular type of account and payment due dates. Also, the first queue may only include accounts that are associated with inward calls received from customers. In such cases, the first queue may include inward calls of customers currently waiting to speak with an operator or resolve an issue.

As illustrated at block 318, the first calling mode is switched to a second calling mode. For example, in order to reduce workloads, speed up efficiency, and improve customer satisfaction, the system of process 300 may switch the calling mode from an incoming call mode to a view first mode or a manual dial mode. In some embodiments, the switch to the second calling mode occurs after the inward call has been completed. In this way, the user is not completely side tracked and can complete his or her assigned queue with minimal interference but still reduce wait times and customer abandonment rates. In other cases, the switch can occur after more than one inward call is completed or other tasks are completed. For example, the switch may occur after completion of at least one inward and after the user has written a report or forwarded a report to a database.

In further embodiments, the system of process 300 determines a delay in incoming calls associated with the first queue. For example, if the number of incoming calls for accounts of the first queue is low, the incoming calls are infrequent, or if the ratio of operators to incoming calls is high, the system switches the calling modes. In this way, the user can continue to work efficiently without lulls in calls being initiated or received by the user. In the illustrated embodiment, the second calling mode comprises the view first mode, but it will be understood that another calling mode such as the manual dial mode may also be blended with the first and/or second calling modes of the process 300.

In other embodiments, the mode is not switched. For example, the calling mode may comprise a hybrid calling mode that includes at least a portion of the view first mode, the manual dial mode, the autopace mode, the inward mode, and/or the outward mode. In such cases, the process 300 proceeds directly to step 320 without switching modes.

As illustrated at block 320, an additional account of a second queue of the at least one queues is launched. For example, a user may access the "Queue Explorer" on the system at their workstation to access assigned queues (see, e.g., FIG. 4).

As illustrated at block 322, the user is allowed to select a delay period and/or dialing strategy for each account in the at least one queue. The delay period allows the user to absorb the information associated with a launched account before proceeding with the call. For example, the user may set the delay to 5 seconds for simple tasks or accounts, but may set the delay period to 18 seconds for more complex accounts. The dialing strategy includes rules for prioritizing the dialing order for an account. For example, based on predetermined filtering and sorting processes, memos attached to the account, or calling history, the user may determine that between the hours of 6:15 PM and 7:15 PM it is best to dial the home phone first before dialing the work phone number because the customer has answered their home phone 68% of the time in the past 6 months at that time, but has only answered the work phone 1% of the time number between the same hours in the past 6 months. Also, the dialing strategy may also include rules that instruct the dialer (whether virtual, manual, assisted, or other dialer) to dial only certain customers or other entities attached to the account and not others. The dialing strategy can prioritize not only the dialing order for a particular customer associated with an account but also the dialing priority for the customers or other entities associated with the account. For example, if there is more than one business or person associated with the account, the dialing strategy can include rules for dialing the business entity first before dialing the manager or the owner of the business entity, and the dialing strategy rules may further instruct the dialer to prioritize the dialing order for the business entity, the manager, and the owner if there is more than one phone number associated with each account entity.

As illustrated at block 324, an assisted outward call is initiated from the user's computing device after the delay period and/or in accordance with the dialing strategy. In some embodiments, the first outward call is initiated in the view first mode as discussed above. Although the illustrated embodiment initiates the first outward call in the view first mode, it will be understood that other calling modes can be used and that dialing may be initiated manually. In some embodiments, the first outward call is manually dialed. The dialing mechanism for initiating the first outward call (or second outward call described below) includes a manual dialing device such as telephones or cellphones that utilize digital technology or land lines, virtual dialing devices, and the like.

In additional embodiments, a second outward call is initiated. In situations where there are currently no inward calls, for example, a second outward call may be placed. In some embodiments, the user selects and places the second outward call. For example, only a portion of a dialing list for the additional account of the second queue account may have been placed (e.g., only the first number out of four phone numbers may have been dialed), or that user may be required to put additional data into the fields of the additional account. In other cases, the second outward call may be associated with an entirely different account than the additional account in the second queue. In still other embodiments, the second outward call may be associated with a third queue of the at least one queue.

As illustrated at block 326, the second calling mode is switched back to the first calling mode. In some embodiments, the calling mode switch is in response to the completion of the assisted outward call. In further embodiments, the user is eligible to receive an inward call after completing the outward call or completing the work associated with the additional account in the second queue. The system can be configured to push an incoming call from first queue or other queue to the user after each and every outward call is completed. If there is a large number of incoming calls in first queue, this switching allows the modes to blend and reduces caller abandonment rates and waiting times for inward calls. In one specific example, a user that has three phone numbers to dial for a particular account (e.g., a home phone, a work phone, and an alternate phone) will be eligible to receive an inward call after completing the first call. In other examples, the user may be eligible to receive an inward call after the tasks for the account is complete, i.e., after completing the all three calls and moving or searching to another account.

In additional or alternative embodiments, the second calling mode is switched to a third calling mode. For example, if the user has completed the assisted outward call and if there are no inward calls in the first queue or if there are no pending accounts that need attention in the second queue, the system of process 300 may switch the user to a third calling mode such as the manual dial mode. In such embodiments, the third calling mode is associated with a third queue of the at least one queues. For example, if the third account has a large number of pending accounts that need to worked on or if there are not enough operators to work on the third queue, the user may be presented with the third queue. In other embodiments, the third calling mode is associated with the first queue or second queue. For example, the user may be able to choose which inward call to take in the first queue in a manual inward mode rather than an automated inward mode. In other examples, the second calling mode of the second queue may be switched from the view first mode to a manual dial mode or other mode.

As illustrated at block 328, a second account from the first queue is launched. The user is returned to the first queue on the desktop. In some embodiments, the first account may be re-launched from the first queue in situations where the user had not completed the tasks for the first account. In other embodiments, the second account is launched after the outward call is completed or after the switch back to the first calling mode. The second account may include, for example, the next account in the first queue after the first account, or any other account associated with the next customer call.

As illustrated at block 330, a second inward call is provided to the user in accordance with the first calling mode. After the second inward call of the first queue is completed, the user may be provided with another inward call or switched to another calling modes based on customer waiting times, the volume of customer calls, and other parameters associated with the first or second queues.

Although the embodiments in FIGS. 2-3 are related to telephone calls, it will be understood that other forms of communication such as email, texts, facsimile messages, and the like may also be implemented in process 300.

Figure 4:
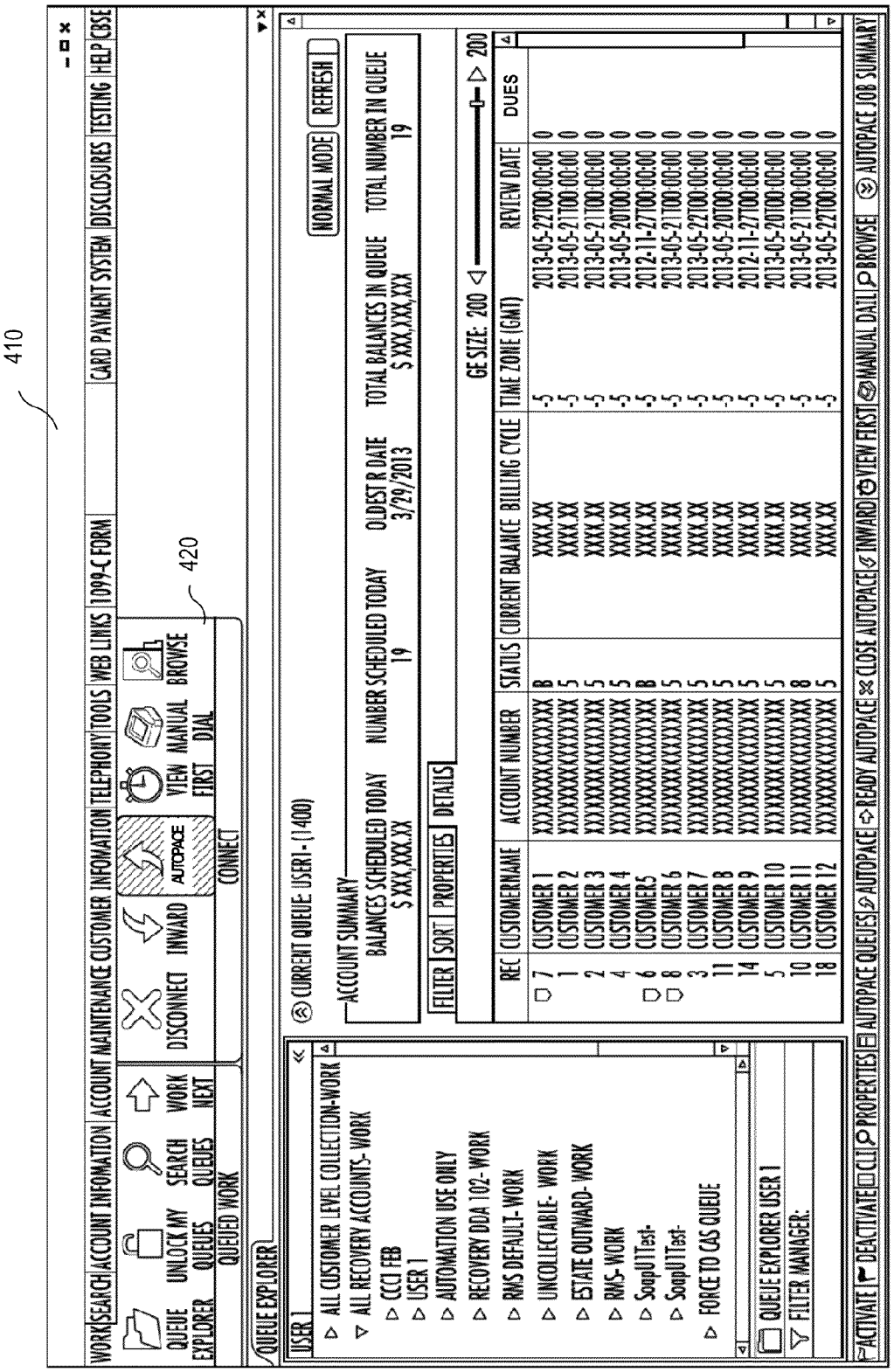
FIG. 4 is an illustration of a graphical user interface for providing virtual calling modes to a system user in accordance with various embodiments.
Figure 5:
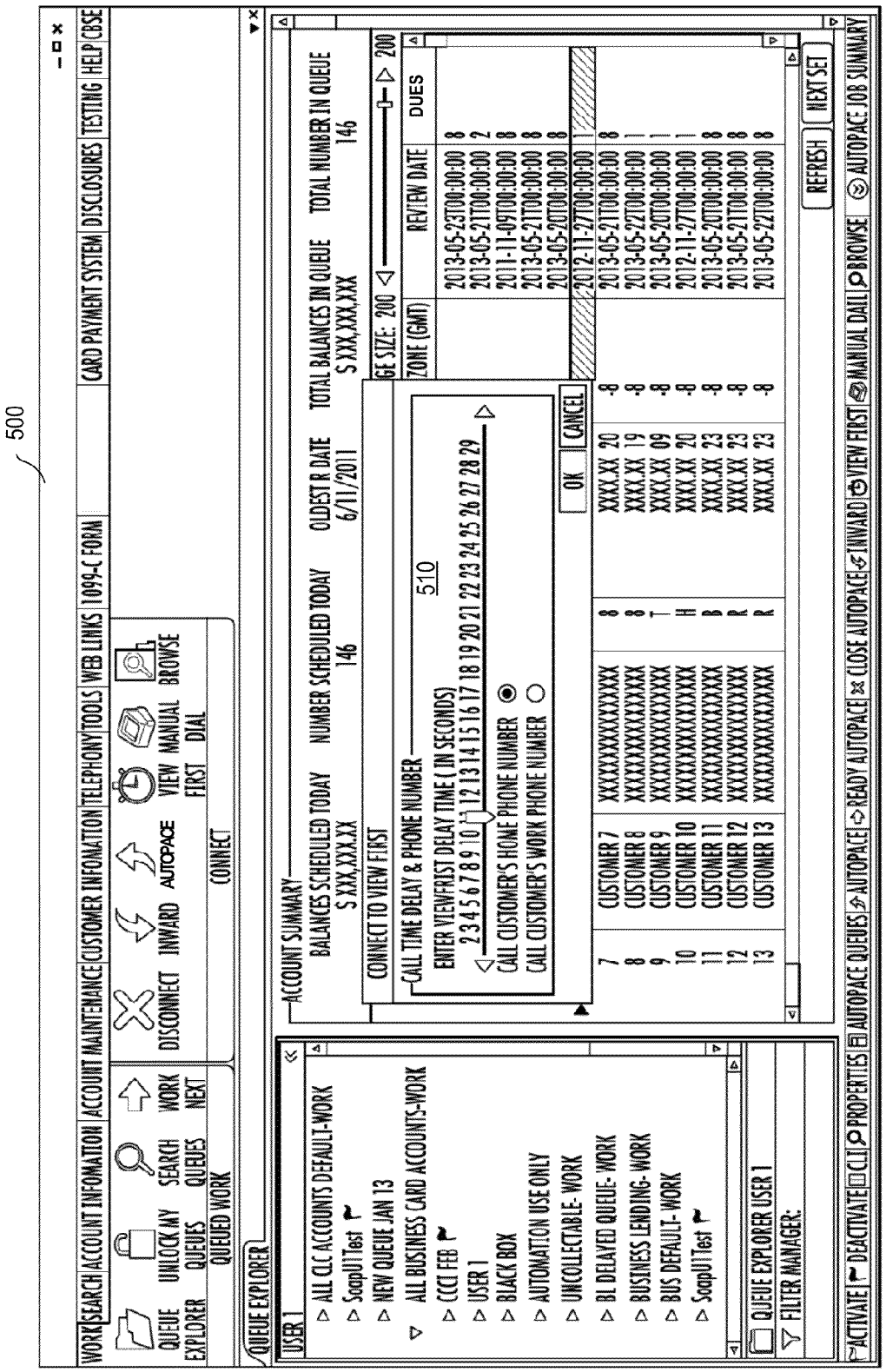
FIG. 5 is an illustration of a graphical user interface for providing virtual calling modes to a system user in accordance with various embodiments.
Figure 6:
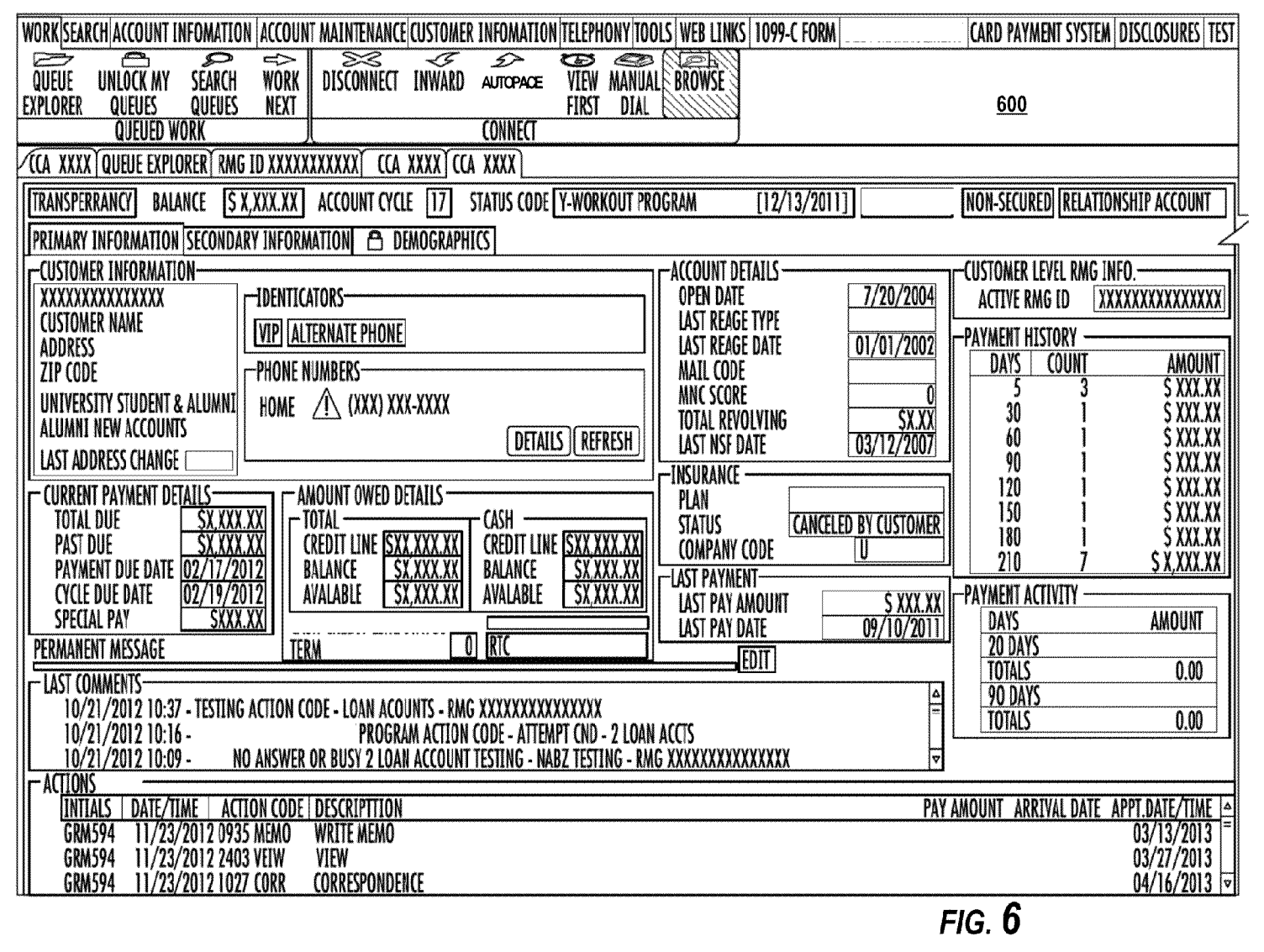

FIGS. 4-6 illustrate screen shots of graphical user interfaces (GUI) of a system for providing, configuring, and implementing virtual calling modes for virtual dialing campaigns.

In FIG. 4, the "Autopace" mode is selected in a connect ribbon 420 located near the top of a graphical user interface (GUI) 410. The connect ribbon 420 enables the user to quickly determine the mode that they are currently using, change modes, or disconnect. Also included in the GUI 410 is a "Queued Work" ribbon that allows the user to quickly access the queue explorer tool and navigate through queues. As shown on the left hand side of the GUI, the queue explorer lists various levels of queues and types of accounts and the queues or accounts in each level.

The "Current Queue" is displayed along with an "Account Summary," which provides an overview of the queue. A filter and sort tab enable the user to customize the priority and filter the accounts in the queue according to inputted account or customer criteria. In FIG. 4, a "Details" tab is selected and shows the listing of all of the accounts in the queue and details of the account such as customer name, account number, account status, current balance, billing cycle, time zone, and schedule review date. The user can select and account under the details tab to view the account as illustrated in FIG. 6 and as discussed in more details below.

In FIG. 5, GUI 500 displays a view first mode of the system. In the illustrated embodiment, the user selects an account and sets the call time delay for the account and the phone number to be dialed. In the example, the user will be given a total of 11 seconds after launching the selected account or upon connection to the view first mode to review the details of the account. After the 11 seconds, the customer's home phone number is dialed from the user's desktop. In this way, each account in the queue is customized to the user's needs. Although the illustrated embodiment shows the user setting the delay period and the dialing strategy for a particular account, it will be understood that the user may also set the same delay period and dialing strategy for other accounts or all accounts in the queue. In other embodiments, the delay period and phone number is only selected for the first account in the queue. In still other embodiments, an administrator may set up the delay period and dialing strategy.

In FIG. 6, a portion of a GUI 600 is illustrated. In this illustration, multiple customer account tabs are open. In some embodiments, the accounts are selected from a queue. In GUI 600, a "Primary Information" sub-tab is displayed in an account tab and includes account details such as the customer's name and address, name of the account, type of account, customer status indicator (i.e., "VIP"), phone numbers associated with the account, account details, insurance details, last payment information, current payment details, amount owed details, customer level payment history, comments, and actions. Less critical data such as other accounts, account transfers, transactions, and other non-payment related details may be included in the "Secondary Information" tab. The account data allows the user to easily determine what questions to ask the customer and allows the user to update the account data as needed.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for implementing virtual dialing campaigns using virtual calling modes, the system comprising:
   a computer apparatus including a processor and a memory; and
   a virtual dialer software module stored in the memory, comprising executable instructions that when executed by the processor cause the processor to:
      receive account data associated with customer accounts;
      identify an account status associated with each of the accounts based on the account data;
      group the accounts into one or more queues based on the identified account status;
      select a first call mode for at least one queue;
      determine dialing parameters associated with the first calling mode;
      provide the at least one queue to a user via a display of a computing device that is in communication with the system; and
      allow the user to select at least one of a delay period and dialing strategy for at least one account in the at least one queue,
      wherein the dialing strategy comprises a dialing order for every phone number associated with the at least one account.

2. The system of claim 1, wherein the executable instructions further cause the processor to:
   launch a first account from a first queue of the at least one queue;
   provide an inward call to the user in accordance with the first calling mode.

3. The system of claim 2, wherein the executable instructions further cause the processor to:
   switch the first calling mode to a second calling mode.

4. The system of claim 3, wherein the executable instructions further cause the processor to:
   allow the user initiate an outward call associated with a second account of a second queue of the at least one account in accordance with the second calling mode.

5. The system of claim 2, wherein the executable instructions further cause the processor to:
   switch the second calling mode back to the first calling mode;
   launch a second account from the first queue; and
   provide a second inward call to the user in accordance with the first calling mode.

6. The system of claim 4, wherein the executable instructions further cause the processor to:
   allow the user to select an account from the second queue and dial a second outward call from the computing device.

7. The system of claim 1, wherein the executable instructions further cause the processor to:
   initiate an assisted outward call associated with the at least one account from the computing device after the delay period or in accordance with the dialing strategy.

8. The system of claim 1, wherein the at least one queue comprises accounts having balance due dates for a pre-selected period of time.

9. The system of claim 1, wherein the account data comprises account numbers, customer names, account phone numbers, account balances, payment due dates, account calling history, account velocities, or regulations.

10. The system of claim 1, wherein the executable instructions further cause the processor to:
    apply filter criteria to the account data; and
    prioritize the accounts based on the filter criteria.

11. A computer program product for implementing virtual dialing campaigns using virtual calling modes, the computer program product comprising:
    a non-transitory computer readable storage medium having computer readable program code embodied therewith, the computer readable program code comprising:
       computer readable program code configured to receive account data associated with customer accounts;
       computer readable program code configured to identify an account status associated with each of the accounts based on the account data;

computer readable program code configured to group the accounts into one or more queues based on the identified account status;

computer readable program code configured to select a first calling mode for at least one queue;

computer readable program code configured to determine dialing parameters associated with the first calling mode;

computer readable program code configured to provide the at least one queue to a user via a display of a computing device of the user; and computer readable program code configured to allow the user to select at least one of a delay period and dialing strategy for at least one account in the at least one queue, wherein the dialing strategy comprises a dialing order for every phone number associated with the at least one account.

12. The computer program product of claim 11, further comprising computer readable program code configured to launch a first account from a first queue of the at least one queue and provide an inward call to the user in accordance with the first calling mode.

13. The computer program product of claim 12, further comprising computer readable program code configured to switch the first calling mode to a second calling mode.

14. The computer program product of claim 11, further comprising computer readable program code configured to initiate an assisted outward call associated with the second account from the computing device after the delay period or in accordance with the dialing strategy.

15. A computer-implemented method for implementing virtual dialing campaigns using virtual calling modes, the method comprising:

receiving account data associated with customer accounts;

identifying, by a processor, an account status associated with each of the accounts based on the account data;

grouping the accounts into one or more queues based on the identified account status;

selecting, by a processor, a first call mode for at least one queue;

determining dialing parameters associated with the first calling mode;

providing, by a processor, the at least one queue to a user via a display of a computing device of the user; and allowing the user to select at least one of a delay period and dialing strategy for at least one account in the at least one queue, wherein the dialing strategy comprises a dialing order for every phone number associated with the at least one account.

16. The computer-implemented method of claim 15, further comprising:

launching, by a processor, a first account from a first queue of the at least one queue;

providing an inward call to the user in accordance with the first calling mode.

17. The computer-implemented method of claim 16, further comprising:

switching, by a processor, the first calling mode to a second calling mode.

18. The computer-implemented method of claim 17, further comprising:

initiating, by a processor, an assisted outward call associated with a second account of a second queue of the at least one account in accordance with the second calling mode.

* * * * *